United States Patent [19]

Annamalai

[11] Patent Number: 5,023,872
[45] Date of Patent: Jun. 11, 1991

[54] FDDI BIT ERROR RATE TESTER

[75] Inventor: Kadiresan Annamalai, Milpitas, Calif.

[73] Assignee: Advanced Micro Devices, Inc., Sunnyvale, Calif.

[21] Appl. No.: 173,325

[22] Filed: Mar. 25, 1988

[51] Int. Cl.⁵ ............................................ G06F 11/00
[52] U.S. Cl. .................................... 371/5.1; 371/20.6
[58] Field of Search ........................ 371/5, 5.1, 20.6; 370/16, 13, 17, 88, 86, 85

[56] References Cited

PUBLICATIONS

Joshi, "High Performance Networks: A focus on the Distributed Data Interface (FDDI) Standard", *IEEE Micro*, 06/1986, pp. 8–14.
Moor et al., "FDDI: A Federal Government LAN Solution", *Telecommunications*, vol. 23, No. 9, Sep. 1989.
Kajos et al., "FDDI Link Error Rate Monitor", 14th Conference on Local Computer Networks, Minneapolis, MN, Conference Date, Oct. 1989 (abstract only).
Figueroa, "Single Chip Implements FDDI Physical Layer: CMOS Part Consumer Less than 800MW", *EDN*, vol. 35, No. 13A, Jun. 1990.
Guarino, "Measuring Equipment for the Physical Channel of FDDI", *SPIE-Int. Soc. Opt. Eng. (U.S.A.)*, vol. 991, pp. 96–104, 1988.
Mokhoff, "Five-Chip Tokey-Passing Set Operates LANs at 100 Mbits/s", *Electronic Design*, Sep. 17, 1987.
Ullal et al., "Fiber Optic Network Standard Delivers Speed and Reliability", *Computer Design*, Oct. 1, 1987.
McCool, "Implementing FDDI with Supernet (T.M.) Chip Set", Presented at FOC/LAN Conf., Oct. 29, 1987.
Annamal et al., "FDDI Chips: The Dawn of a New LAN", *Electronic System Design Magazine*, Oct. 1987.
Ross, "FDDI-An Overview", *Unisys* (date unknown).

*Primary Examiner*—Jerry Smith
*Assistant Examiner*—David Huntley

[57] ABSTRACT

Methods and apparatus are set forth which facilitate continuous bit error rate monitoring at the physical (PHY) management layer in a Fiber Distributed Data Interface (FDDI), duel token ring network. The monitoring is performed using existing line status information from PHY. Simple error detection logic. In combination with an error counter and a timer, is used to detect errors during active or idle line state conditions, independent of Media Access Control (MAC) layer support.

13 Claims, 4 Drawing Sheets

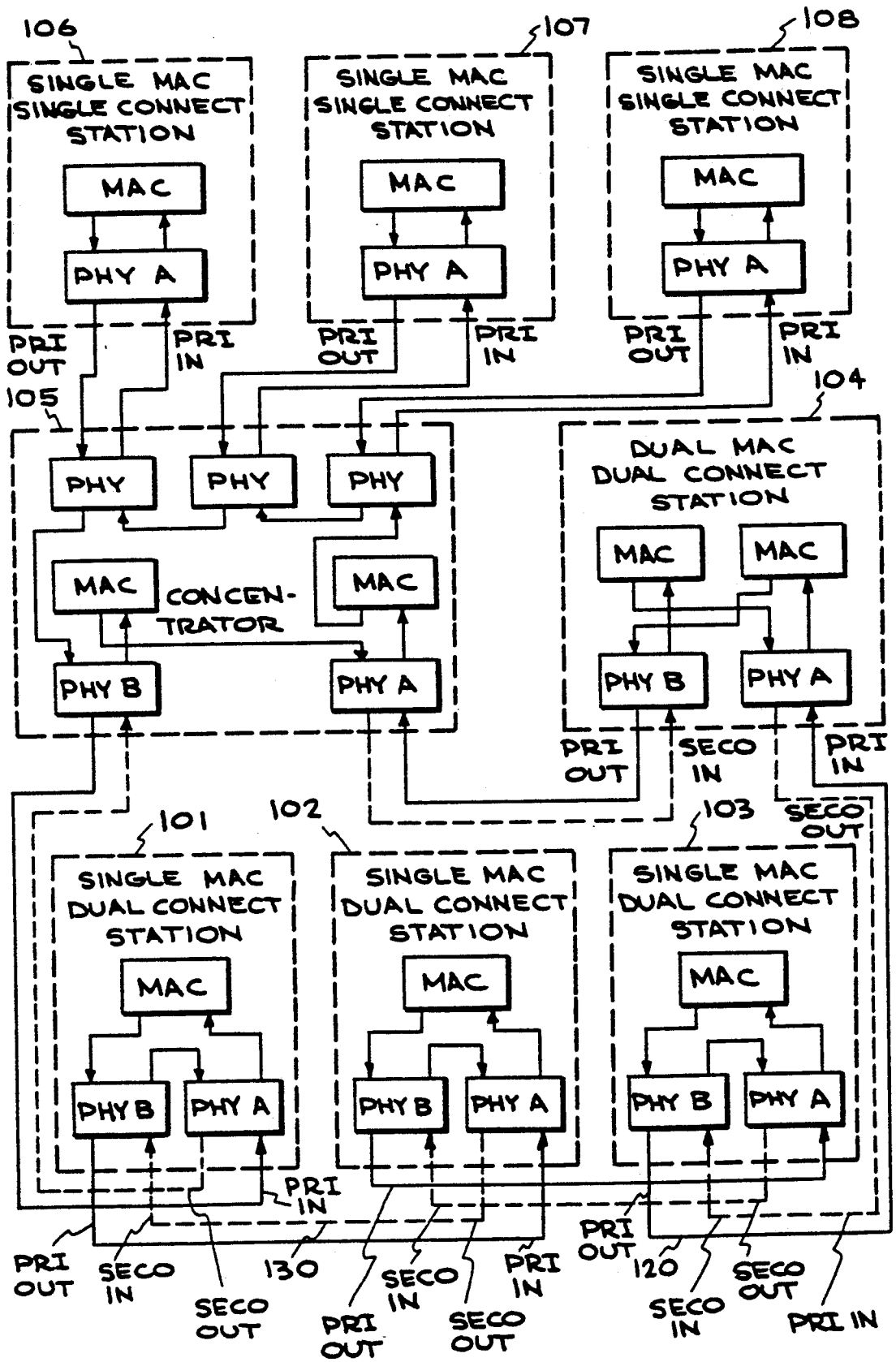
FIG. 1   PRIMARY RING ———
         SECONDARY RING -----

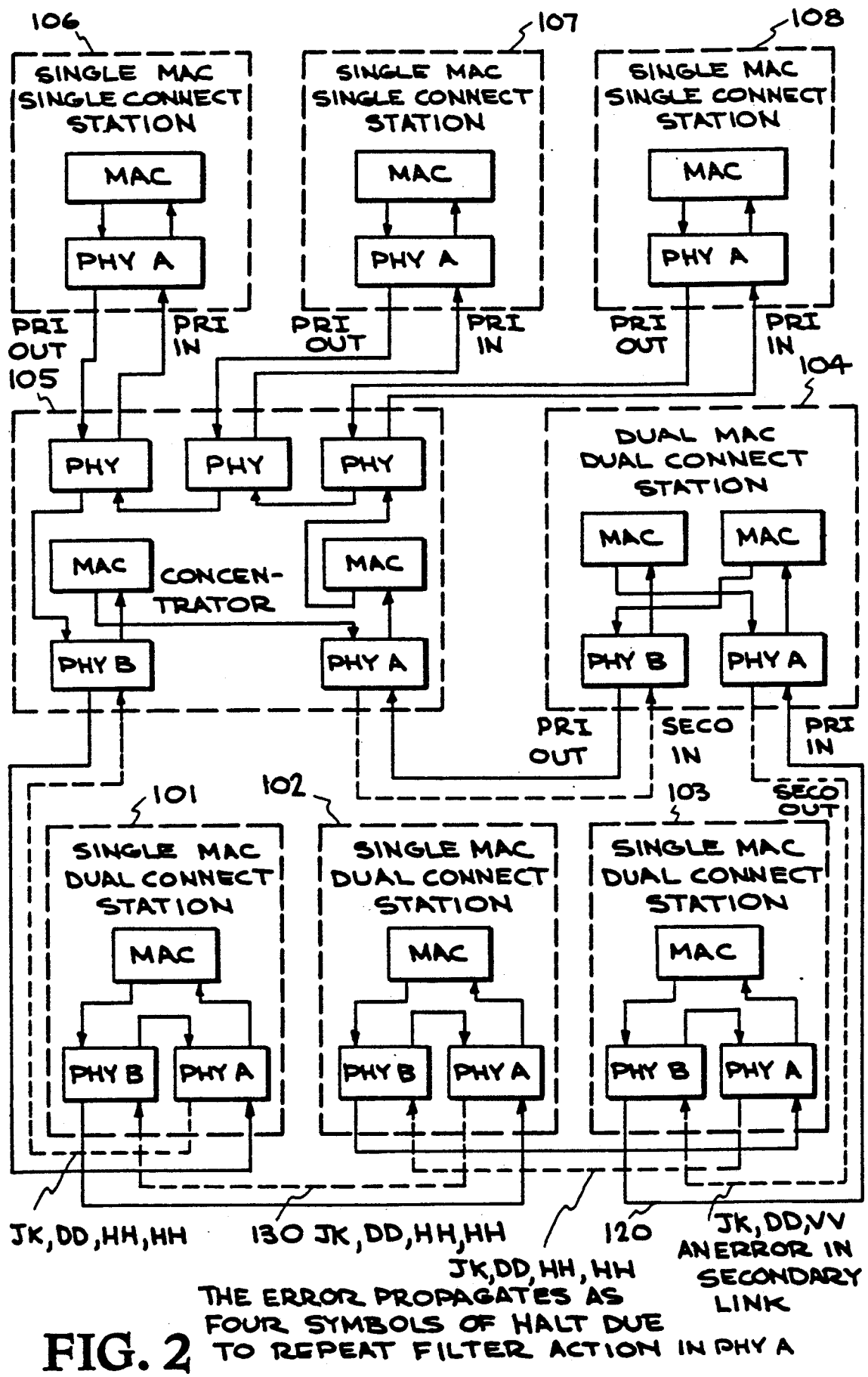
FIG. 2 THE ERROR PROPAGATES AS FOUR SYMBOLS OF HALT DUE TO REPEAT FILTER ACTION IN PHY A

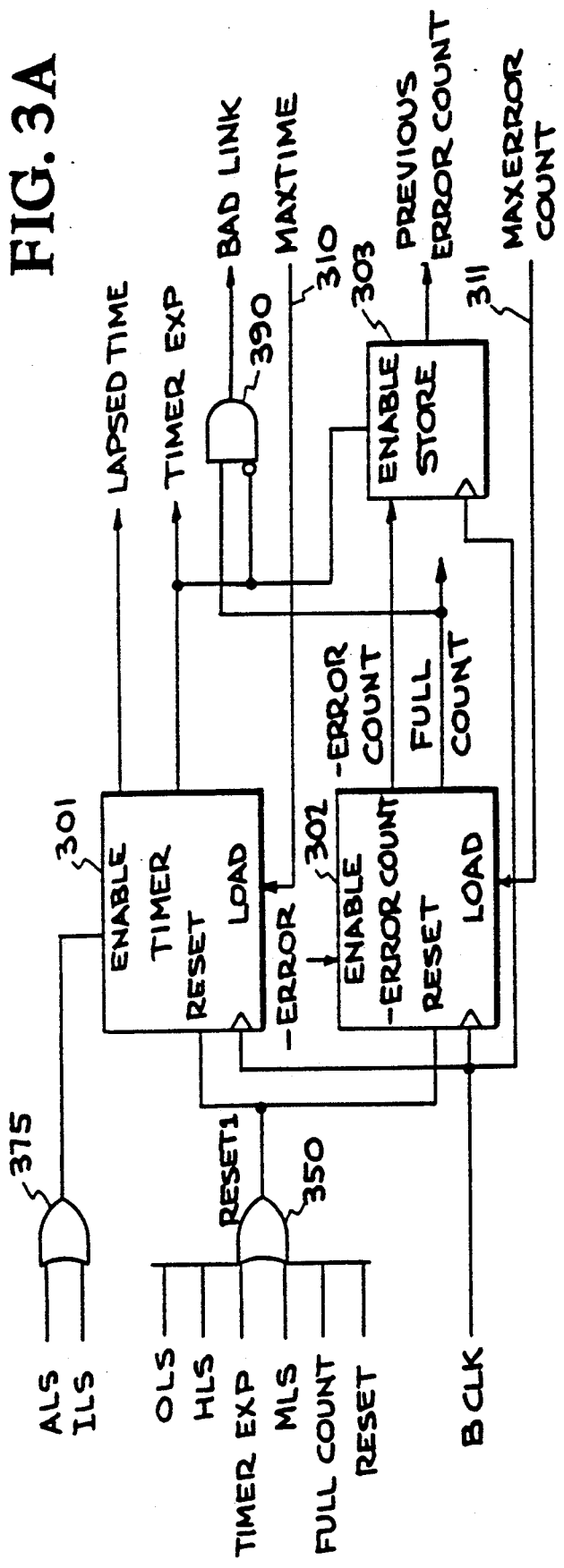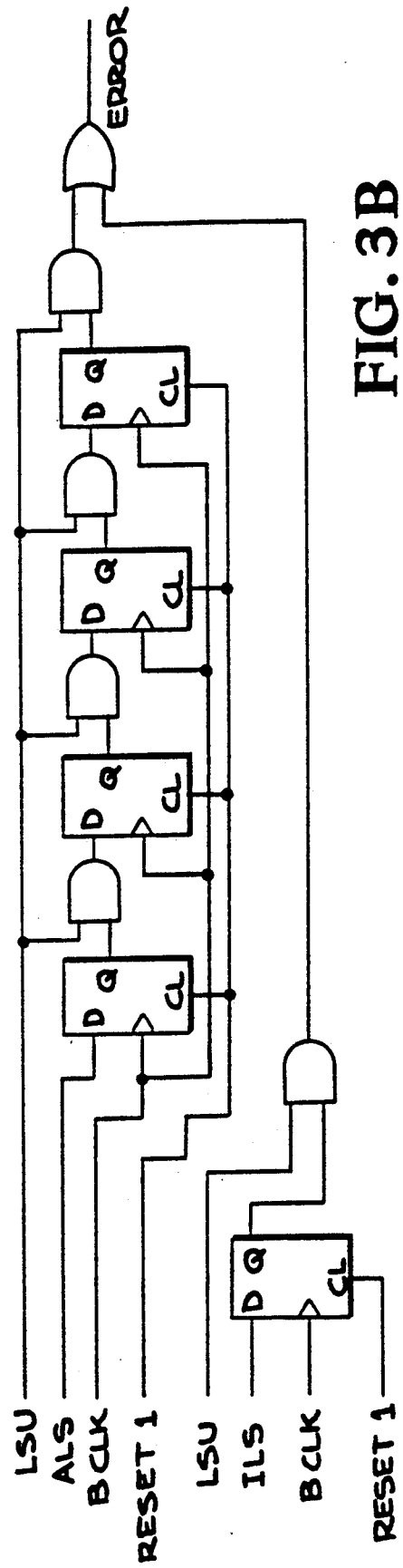

FDDI BIT ERROR RATE TESTER

BACKGROUND OF THE INVENTION

1. Field of the Invention

The invention generally relates to methods and apparatus used in Fiber Distributed Data Interface (FDDI) networks to monitor link quality and isolate faults. More particularly, the invention relates to methods and apparatus which continuously monitor bit error rate at the physical (PHY) management layer of the FDDI hierarchy, using existing line status information, to localize and isolate faults quickly and accurately.

2. Description of the Related Art

FDDI token ring networks are well known to those skilled in optical data path communications technology. FDDI is a result of American National Standards Committee X3T9 and grew from the need for high speed interconnection among main frames, minicomputers and associated peripherals. It supports a variety of front-end, back-end and backbone networks configured in a variety of topologies and provides for secure 100 and 200 megabit per second transmission across long distance links (e.g., 100 km), with excellent immunity to the effects of electrical radiation and common mode voltages.

In order to appreciate the context in which the novel tester methods and apparatus are used, a brief description of the structure of an FDDI token ring network will first be set forth.

At least part of the rationale behind organizing FDDI as a ring is based on the nature of optical communication. Bus and passive star topologies would require the optical transmission to be detected at several sources simultaneously. Although fiber-optic taps are currently becoming available, the optical attenuation caused by such a device would severly restrict the number of nodes on the network.

Fiber-optic communication is still best suited for point-to-point transmission. Two types of Local Area Network (LAN) topologies can be realized with point-to-point links: the active hub star and the ring. Active stars introduce a single failure point that can disable the entire LAN. Single-ring networks also are prone to failures at any node. FDDI alleviates this problem with the dual-ring approach.

An FDDI ring typically comprises a variety of station types. Class A stations connect to both the primary and secondary rings of the network and are often referred to as "dual attachment stations". Data flows in opposite directions on the two rings. The Class A station can act as a wiring concentrator, serving to interconnect several single-attachment or Class B stations to the ring. Wiring concentrators give the network administrator a single maintenance point for a large number of stations. Class B attachments trade lower implementation costs and ease in servicing against the fault tolerance afforded in a Class A station.

The FDDI defined in X3T9 relates to the lower layers of the Open Systems Interconnection/International Organization for Standardization (OSI/ISO) model as follows.

The lowest layer of the OSI model, the Physical Layer, is described in two documents. The first, the FDDI Physical Medium Dependent (PMD) document, details optical specifications for FDDI. PMD defines the wavelength for optical transmission, the fiberoptic connector employed, and the function of the optical receiver. PMD also details an optional optical by-pass switch that can be incorporated within a station.

The second document describes the FDDI Physical Sublayer (PHY) which is the upper sublayer within the OSI Physical Layer. PHY defines the 4B/5B group-encoding scheme used to represent data and control symbols on the network. PHY also describes the method for retiming transmission within the mode.

The Data Link Layer in the OSI model is often subdivided into two sublayers: Link Layer Control (LLC) and Media Access Control (MAC). FDDI defines the lowest of these sublayers, MAC. Among other things, MAC defines the recovery mechanisms required for FDDI.

Another key element in the FDDI standards is Station Management (SMT). SMT falls outside of the scope of the OSI model and provides the intelligence that allows cohesive operation of the individual sublayers in an FDDI node. SMT defines error detection and fault isolation algorithms.

Having briefly described the structure and components of an FDDI ring it should be clear that physical link integrity needs to be assured. Thus, in high speed token ring networks, it is important to monitor the quality of the physical links on a continuous basis, identify bad links and isolate them. One means of identifying a bad link is to maintain a bit error rate count and exclude a link whenever a threshold of bit error rate, determined by the network manager, is exceeded. This prevents error propagation and insures that network throughput is efficiently maintained.

The FDDI standard has specified certain services in its MAC layer/SMT layer interface for the purpose of monitoring frames with errors or violation symbols. Though it serves as a measure of the quality of the physical connection between adjacent MACs, these services do not monitor an idle ring. Also, these services fail to isolate the fault to a specific physical link if there are many intervening physical links in between adjacent MACs. This situation is bound to happen in a secondary ring with fewer MACs if not all dual attachment stations have two MACs in them. In such cases, a need arises to monitor link quality at the PHY layer level.

Moreover, dual MACs cannot isolate single errors in single attachment stations connected to a concentrator. This is because the MAC at the concentrator sees only the final PHY which attaches to its single attachment station. Though known connection management (CMT) methods and apparatus can take care of long term noise, these methods and apparatus cannot account for single errors.

For the aforementioned reasons, it would be desirable to be able to continuously monitor link quality at the PHY layer without using the MAC.

SUMMARY OF THE INVENTION

Methods and apparatus are described which provide continuous bit error rate monitoring at the PHY level using existing line status information from PHY. Simple error detection logic, in combination with an error counter and a timer, is used to detect errors during active or idle line state conditions.

The novel method (and apparatus for implementing it) involves counting n bytes of Line State Unknown (LSU) when in Active Line State (ALS) and m bytes of LSU in Idle Line State (ILS), and treating that as one error event for the purpose of continuous link quality monitoring. According to the preferred embodiment of the invention n=4 and m=1.

The only assumptions made in this method are that the error does not occur as the last byte of a frame and that the error occurs as an LSU. If it occurs as the last or the second last byte, that count is missed. Otherwise all other cases of noise are accounted for. If there is more than one noise event in a frame it is still counted as one noise event. More than one noise event is less likely for a random noise situation.

Further, according to the invention, Line State (ALS or ILS) signals are used to enable a timer which measures the duration of time over which link quality is being monitored.

The timer can be reset by any of a set of signals including certain signals generated internally by the novel tester, system generated signals and other signals generated by encoder/decoder (ENDEC) logic such as described in U.S. Pat. No. 4,703,486 issued Oct. 27, 1987 to Bemis, assigned to the same assignee as this invention.

By way of example, the ENDEC logic generates the HALT, QUIET, MASTER and IDLE line state indicator inputs used by the novel tester (in a manner to be described hereinafter) to monitor bit error rate count over a controlled time interval.

The timer is used in combination with an error counter which accumulates an error event count, periodically stores the count and, on exceeding a predetermined error threshold, signals a bad link. In accordance with the preferred embodiment of the invention, bad link signals are sent to upper layers, outside of a given FDDI station, such as the System's Management Application Process (SMAP) layer. From such a layer control can be exercised to excise a bad link if possible.

The logic for generating error event signals is described in detail hereinafter and can be fabricated using a combination of D flip-flops, AND gates and an OR gate.

The novel tester can be located either inside or outside the PHY layer; but preferably is situated in the Station Management Layer which is parallel to the MAC and PHY layers.

A principal object of the invention is to be able to perform continuous bit error rate monitoring at the PHY level of an FDDI.

A further object of the invention is to be able to perform said bit rate monitoring using existing line state information available at the PHY layer.

Another object of the invention is to provide a tester that can be easily fabricated using low cost, off-the-shelf components.

Further yet, it is an object of the invention to provide a tester that may be installed in the SMT and which provides link status to upper layers such as the SMAP; but which is fully operational if installed in other locations, such as within the PHY layer.

The invention meets the aforesaid objectives and thus features the ability to perform continuous bit error rate monitoring at the PHY layer using existing line state information available at the PHY layer, and is comprised of simple, low cost, off-the-shelf components, etc.

These and other objects and features of the invention will become apparent to those skilled in the art upon consideration of the following detailed description and the accompanying Drawing, in which like reference designations represent like features throughout the FIGURES.

BRIEF DESCRIPTION OF THE DRAWINGS

FIG. 1 depicts a typical dual FDDI ring.

FIG. 2 depicts the same FDDI ring as shown in FIG. 1 with an error in the secondary ring between FDDI stations 103 and 104.

FIG. 3a depicts the preferred embodiment of the novel FDDI bit error rate tester while FIG. 3b depicts logic suitable for generating error event signals according to the preferred method for generating said signals.

DETAILED DESCRIPTION

Figure 4:
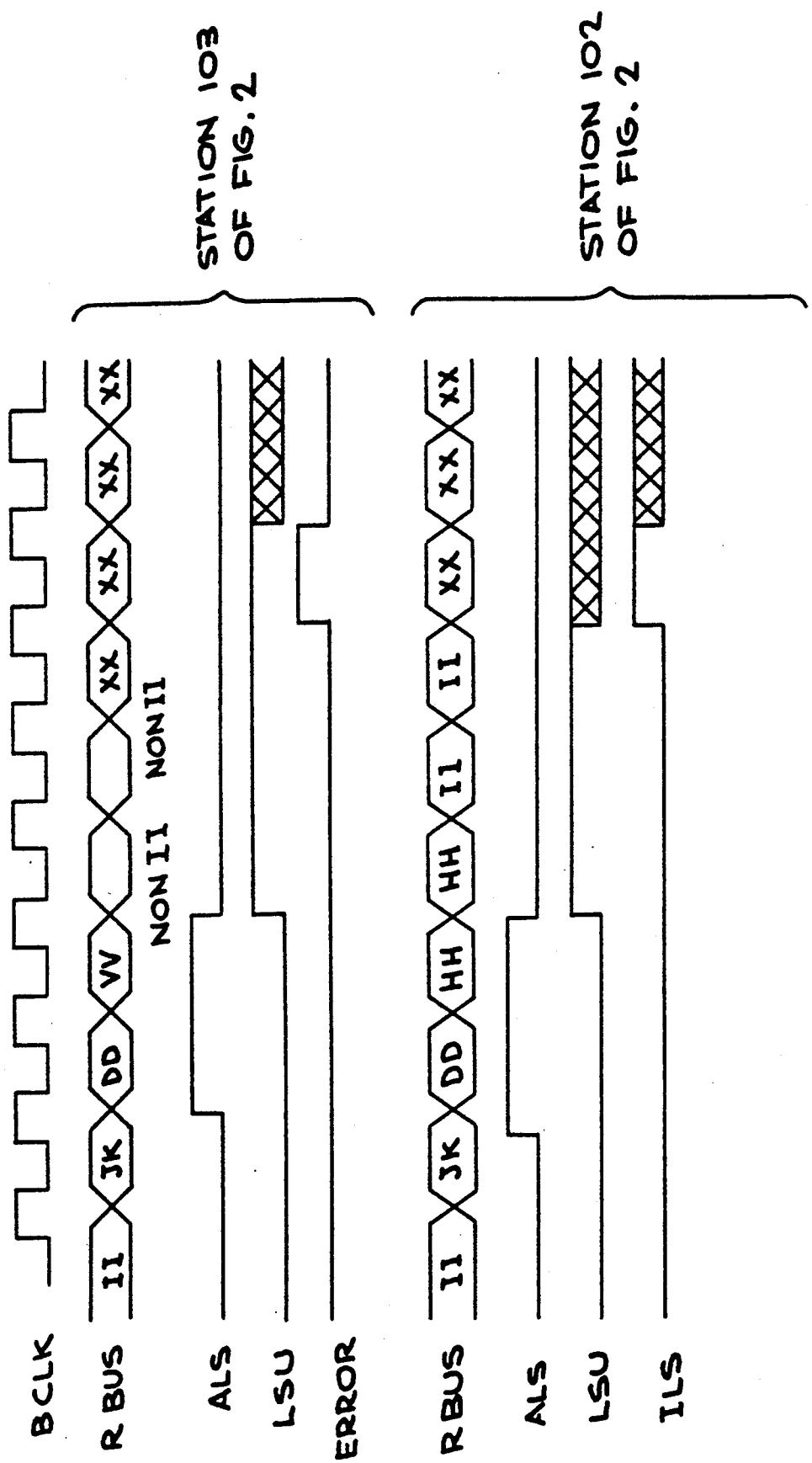
FIG. 4 depicts the timing and event sequence used by the methods taught herein, for generating an error event signal via the hardware shown in FIG. 3 and 3b. More particularly, the timing diagram of FIG. 4 shows an error event being detected, signalled and isolated in FDDI station 103 of FIG. 2 and further shows that the error does not propagate to FDDI station 102 of FIG. 2.

FIG. 1 shows the configuration of a typical dual FDDI ring. Stations 101, 102 and 103 are all single MAC dual attachment stations. Station 104 is a dual MAC dual attachment station. Station 105 is a concentrator to which single MAC single attachment stations 106, 107 and 108 are attached. The primary ring is traced by a continuous line, shown as 120 in FIG. 1, and the secondary ring is traced by dotted line 130. The MAC and PHY layers in a given FDDI station are labeled along with the data path through each station being indicated. Finally, the primary and secondary inputs and outputs, to and from each station, are separately labeled.

FIG. 2 shows the same ring where there is a fault in secondary ring 130 at the physical link between station 104 and station 103. Since the secondary ring does not have a connection to MAC in station 103, the MACs lost count mechanism is not able to detect and isolate the error. PHY A of station 103 puts out 4 symbols of HALT when it sees the violation symbol V in the midst of a frame, using its ENDEC transmit line as described in copending U.S. Patent Application Ser. No. 073,532, filed July 15, 1987, entitled "Communication Filter", cross referenced to related copending applications 683,281 and 683,434, now U.S. Pat. Nos. 4,703,486 and 4,692,894 respectively, all assigned to the assignee of this invention. Application Ser. No. 073,532 (now U.S. Pat. No. 4,835,776) is hereby incorporated by reference.

Station 102 repeats the same 4 symbols of HALT. The new bit error rate tester in station 103, preferably in the SMT layer (not shown) parallel to the MAC and PHY A and PHY B, alone counts the error and isolates the fault.

FIGS. 3a and 3b show the logic of the FDDI bit error rate tester (BERT). It consists of timer 301, error counter 302, storage device 303 (e.g., a register) and some discrete logic. Timer 301 is used to time the time duration for the error count. The timer value and maximum error count can be programmed by signals on lines 310 and 311 respectively. Whenever Quiet, Halt or Master line state conditions arise, or whenever a reset signal is generated by the system (e.g., the SMAP layer), timer 301 is reset. Timer 301 is also reset by internal BERT signals generated whenever the timer is full or when the error count (to be explained hereinafter) reaches a programmable maximum value. The reset mechanism for counter 301 may be seen with reference to OR gate 350 in FIG. 3a.

The clocking for the logic shown in FIGS. 3a and 3b is a byteclock (BCLK) signal. The timer is enabled during active or idle line state conditions as may be seen with reference to OR gate 375.

Error counter 302 is reset at the same time as timer 301 and is enabled on the occurrence of an error event. An error event is defined to occur (according to the preferred embodiment of the invention) upon the occurrence of 4 consecutive LSU (Line State Unknown) when in Active Line State or upon the occurrence of a single LSU during idle line state conditions.

When timer 301 expires, the error count is stored in register 303 so that at any particular instant, both the previous error count and the current error count is available for the upper management.

The reason 4 bytes of LSU is chosen before an error is flagged is because when a repeat filter repeats 4 symbols of HALT, an idle line state condition is flagged after 3 bytes of LSU. This convention is taught in the incorporated patent application. Hence, only the first node which sees the error, counts the error. All other downstream nodes merely repeat the 4 symbols of HALT. This is shown in FIG. 2 where the 4 H symbols are shown between station 103 and 102, between station 102 and 101, etc. on link 130.

If station 103 did not have the novel bit error rate tester, the fault would propagate all the way to station 105's MAC (in the concentrator) in FIG. 2. Hence the fault would not get localized. Clearly the BERT located in station 103 immediately isolates the fault before propagation of the error is possible.

In the case of an ILS condition, the first station seeing the noise byte can count that towards noise count for the purpose of continuous link quality monitoring. Other downstream stations only see the IDLES because of the repeat filter in the noisy station. Hence the fault is again localized for an IDLE ring.

The BERT can signal to the upper management that the link is not usable when the error count exceeds a specified limit within the programmed maximum timer value. This is accomplished via gate 390 shown in FIG. 3a.

The time duration has to be 2.5 times the time interval for which an error estimate is being calculated. This is because there are 16 data symbols, one QUIET, five HALTs, and 4 VIOLATION symbols in the FDDI coding table. Hence the probability of data getting converted to noise is approximately 0.4. The bit error test duration should therefore be increased 2.5 times the normal bit error test duration.

Since the bit error rate limit per link is $2.5 \times 10^{-10}$ which corresponds to a 400 million byte clock duration to check for one error bit, the test duration should be increased by 2.5 times to 1,000 million byte clocks to see a violation error symbol. To average this over twice the test duration, the time to check for greater then two errors is 2,000 million clock, or 31 bits of counter length. Thus the byte counter (timer) for the preferred embodiment of the invention is 31 bits long.

FIG. 3b shows a combination of D flip-flops, AND gates and an OR gate for signalling an error event to error counter 302 (of FIG. 3a) upon the occurrence of 4 LSUs in the ALS or the occurrence of 1 LSU in the ILS.

FIG. 4 is a timing diagram depicting the operation of station 103 and 102 of FIG. 2 in the face of the fault between station 103 and 104.

The Receive Bus (the link between PHY B and PHY A in station 103) of the ENDEC in PHYB of station 103 is shown, in FIG. 4, to have received the symbols II, JK, DD, VV, non II, non II and XXs (don't care symbols), in the order shown. During the byte clock interval in which the JK delimeter (conventionally used to signal the start of a data packet) is observed by station 103, the ALS output of the ENDEC in PHY B of station 103 goes high. Data (DD) follows and upon recognition of a violation (VV), LSU goes high and ALS goes low. The diagram in FIG. 4 shows the error event being signalled after 4 byte clocks of LSU following the ALS state. This is how the logic depicted in FIG. 3 b operates.

The remaining portion of FIG. 4 shows how station 102 does not have to signal an error, i.e., that the error was indeed isolated at station 103 (again, all with reference to FIG. 2). The Receive Bus for station 102 is shown with II, JK, DD, HH, HH, II, II and don't care symbols on the bus.

The ALS signal generated by the ENDEC in PHY B of station 102 goes high upon seeing the JK delimiter. This stays high until LSU appears. LSU appears on the recognition of a violation symbol such as H, Q or V, as described by the FDDI specification For the example shown in FIG. 4, LSU stays high until 4 I symbols appear. After 4 I symbols, ILS goes active. The 4 H symbols followed by a stream of idle symbols is generated by the repeat filter inside PHY A of station 103 as taught in the incorporated patent application. Hence, clearly, no error signal is generated by station 102, the fault having been isolated at station 103.

What has been described are methods and apparatus for monitoring link quality and isolating faults in an FDDI network. These methods and apparatus meet the objectives set forth hereinbefore.

The foregoing description of a preferred embodiment of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto.

What is claimed is:

1. Apparatus for performing continuous bit error rate monitoring at the physical (PHY) layer in each node of a Fiber Distributed Data Interface (FDDI) dual token ring network wherein each node in said network also includes a Station Management (SMT) layer, a Media Access Control (MAC) layer, a line state signal generator for generating a predetermined set of line state signals under predetermined conditions, and a byte clock signal generator for generating clocking signals, comprising:

(a) tester logic means, coupled to said line state signal generator, for outputting error event signals as a function of a first subset of said set of line state signals which include an Active Line State (ALS)

signal, an Idle Line State (ILS) signal and a Line State Unknown (LSU) signal;

(b) resettable error count means, coupled to said tester logic means, enabled whenever an error event signal is output by said tester logic means, for accumulating an error event count and providing an output signal indicative of said error event count; and (c) resettable timer means, coupled to said line state signal generator and said byte clock signal generator, enabled as a function of a second subset of said set of line state signals, for accumulating a measure of the time elapsed from timer means enablement until timer means reset, and for providing an output signal indicative of said measure of elapsed time.

2. Apparatus as set forth in claim 1 wherein said tester logic outputs an error event signal upon the occurrence of n LSU signal(s) in the ALS and m LSU signal(s) in the ILS.

3. Apparatus as set forth in claim 2 where n=4 and m=1.

4. Apparatus as set forth in claim 2 wherein said second subset of said set of line state signals comprises a QUIET line state signal, a HALT line state signal and a MASTER line state signal.

5. Apparatus as set forth in claim 4 wherein said timer means is also reset upon the presence of any of a third set of signals comprised of a timer expiration signal, a full count signal and an external system reset signal generated by upper management in the FDDI network.

6. Apparatus as set forth in claim 5 wherein the detection and isolation of a bad link is performed independent of said MAC layer.

7. Apparatus as set forth in claim 1 wherein said timer means may be programmed, by inputting a maximum elapsed time input signal, to generate a timer expiration signal whenever the timer means is enabled and reaches said maximum elapsed time before being reset.

8. Apparatus as set forth in claim 7 wherein said error count means may be programmed, by inputting a maximum error count input signal, to generate a full count signal whenever the count means is enabled and reaches said maximum error count before being reset.

9. Apparatus as set forth in claim 8 further comprising storage means, coupled to said timer means and said error count means, for storing said signal indicative of error event count whenever said timer expiration signal is generated.

10. Apparatus as set forth in claim 9 further comprising means for detecting a bad link, coupled to said timer means and said error count means, which generates a signal indicating a bad link if said full count signal is generated prior to timer expiration.

11. A method for isolating faults in a high speed FDDI token ring network, comprising the steps of:

(a) utilizing line state information at the PHY layer of the FDDI network to detect and signal error events including counting n occurrences of Line State Unknown (LSU) in Active Line State (ALS) and counting m occurrences of LSU in Idle Line State (ILS) before signalling an error event;

(b) outputting an error event signal for each detected error event;

(c) counting signalled error events over a predetermined monitoring interval to develop an accumulated error count;

(d) comparing said accumulated error count with a preselected maximum error count value;

(e) periodically storing said accumulated error count value;

(f) signalling a bad link to upper FDDI management whenever said accumulated error count equals said maximum error count value before expiration of the monitoring interval.

12. A method as set forth in claim 11 wherein n=4 and m=1.

13. A method for performing continuous bit error rate monitoring at the physical (PHY) layer in each node of a Fiber Distributed Data Interface (FDDI) duel token ring network, wherein each node in said network also includes a Station Management (SMT) layer, a Media Access Control (MAC) layer, a line state signal generator for generating a predetermined set of line state signals under predetermined conditions, and a byte clock signal generator for generating clocking signals, comprising the steps of:

(a) determining error events, and outputting error event signals, as a function of said line state signals including utilizing Active Line State (ALS), Idle Line State (ILS) and Line State Unknown (LSU) signals present at the PHY layer, independent of MAC layer support;

(b) accumulating an error event count and generating an output signal, indicative of said accumulated error event count over a preselected time interval, for storage at the end of said time interval;

(c) comparing said accumulated error count with a preselected maximum error count; and (d) signalling a bad link if said maximum error count is reached prior to the expiration of said preselected time interval.

* * * * *